April 24, 1951     E. E. K. SPARMANN     2,550,613
MEANS FOR ANCHORING WOBBLE PLATES
Filed Dec. 10, 1946     2 Sheets-Sheet 2
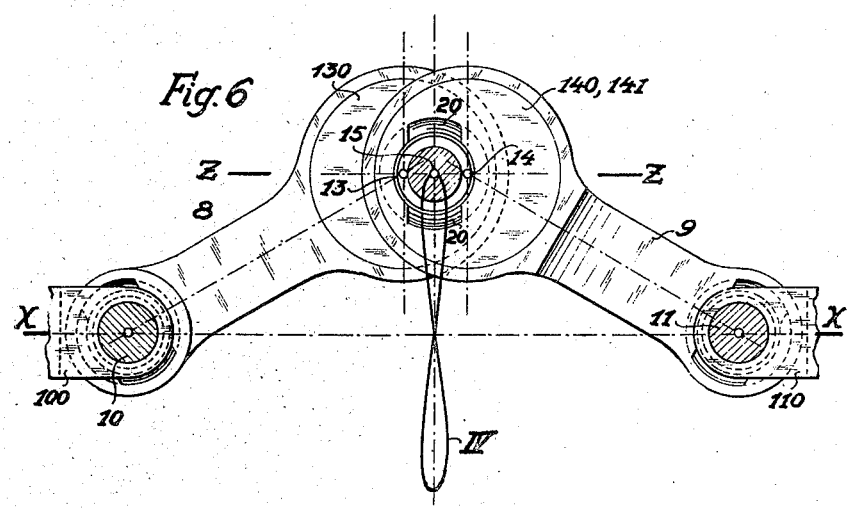
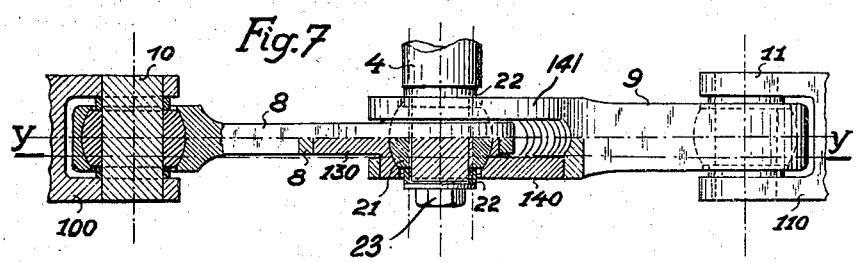
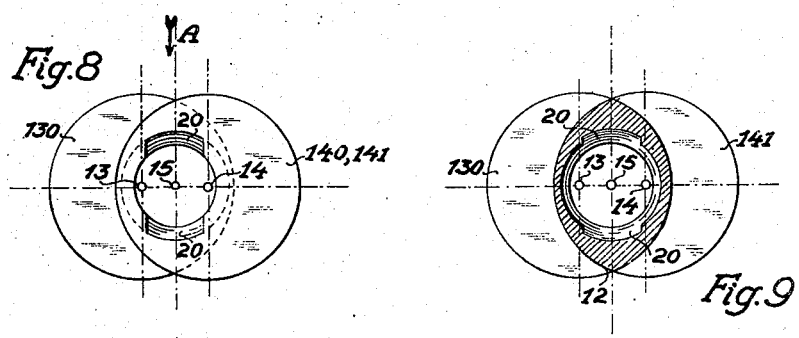
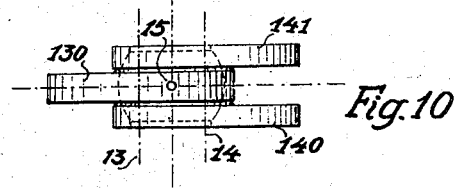

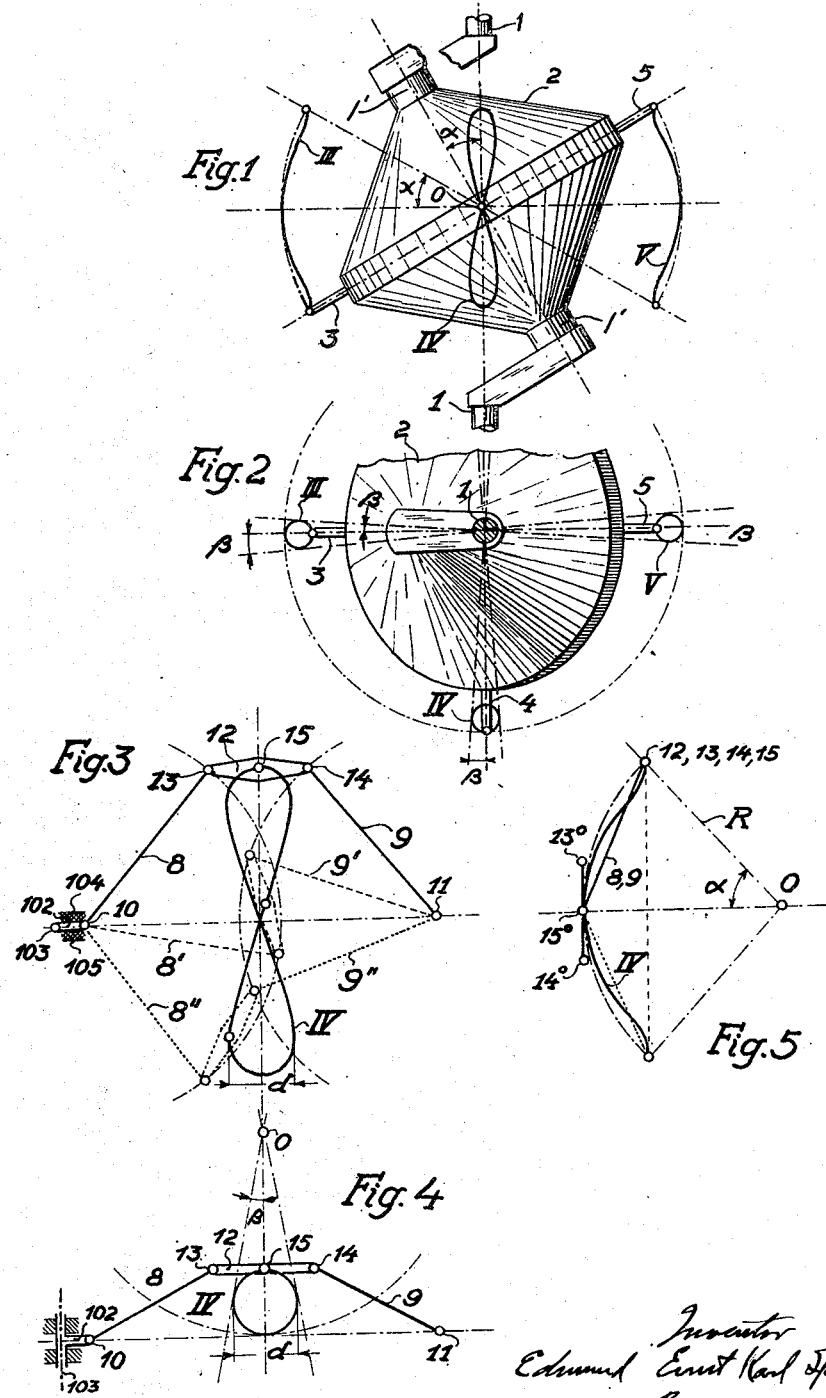

Patented Apr. 24, 1951

2,550,613

UNITED STATES PATENT OFFICE 2,550,613

MEANS FOR ANCHORING WOBBLE PLATES

Edmund Ernst Karl Sparmann,
Stockholm, Sweden

Application December 10, 1946, Serial No. 715,265
In Sweden December 10, 1945

11 Claims. (Cl. 74—60)

The present invention relates to automatic governing means for anchoring of wobble-members in piston engines having wobble-type driving gears and has for its purpose to improve and to simplify the necessary means for preventing rotation thereof. Because the wobble member serves to take up the reaction moment of the machine it must be able to withstand the relatively great stresses occurring in operation while, at the same time, it must guide the points of connection or links of the engine pistons respectively in mutually congruous looped paths of lemniscate shape in three-dimensional space.

According to the invention the means for preventing rotation of the wobble-plate in relation to the engine frame consists of a "lemniscate link guide" the arrangement being such that in the plane of the wobble-plate all points equidistant from the center thereof describe at least approximately mutually congruous paths of lemniscate shape in three-dimensional space.

As the kinematics of the spherical crank operation is not very familiar even in technical circles there will follow first a brief explanation of the pertinent questions having reference to the principal diagrams Figs. 1 to 5.

In the drawings, Figs. 1 and 2 diagrammatically illustrate a wobble-plate gear in two different projections.

Figs. 3, 4 and 5 show in three projections an embodiment of a so called lemniscate link guide and the principal application thereof to the present invention.

Fig. 6 is an elevational view showing the elements constituting the lemniscate link guide;

Fig. 7 is a plan view of the elements shown in Fig. 6 with parts in section for greater clarity.

Fig. 8 is an elevational view showing in detail one of the elements employed in the lemniscate link guide of Fig. 6;

Fig. 9 is an elevational view similar to Fig. 8 with parts in section for greater clarity;

Fig. 10 is a plan view of the parts shown in Fig. 8.

Fig. 1 is a diagrammatic view of a wobble-plate gear connected to the engine shaft 1. The common axis of the inclined crank pins 1' intersects the axis of the engine shaft 1 at a point O at an angle $a$ of inclination. A plane including the point O and passing perpendicularly to the inclined crank pins is called the wobble-plate plane. The wobble-plate body 2 is shown in Fig. 1 in its most common form of a double cone having a common base plane, here coinciding with the wobble-plate plane, and is rotatably supported on the inclined crank pins of the engine shaft 1. In the wobble-plate plane a number of radially projecting connection pins 3, 4 and 5 are provided, the fourth of them not being visible in Fig. 1 and omitted in Fig. 2. These pins correspond to the number of engine cylinders or pairs of such cylinders and are connected to the pistons by suitable means such as connecting rods. The cylinders, pistons and associated parts are omitted from the drawing in order to better illustrate the principle of the device.

In order to transfer the reciprocating movement of the engine pistons arranged around the engine shaft 1 in parallel relation thereto into rotary movement of the engine shaft or vice versa, the wobble-plate body 2 must be prevented from rotating in relation to the engine frame. As previously mentioned means must be provided to allow the wobble-plate to carry out its characteristic movement without rotation with relation to the engine frame.

In order to insure that all oscillating masses, such as the wobble-plate body, the engine pistons and their associated parts are entirely dynamically balanced the kinematic fundamental requirement is that in the wobble-plate plane all points equidistant from the center O thereof, including the piston connection points describe mutually congruous paths of lemniscate type lying on a spherical surface. These loop lines in three dimensions are further characterized in that their maximum width $d = R\ (1 - \cos.\ a)$ in which $a$ is the angle of inclination of the inclined crank pins 1' with respect to the engine shaft 1 and R is the distance of the points from the center O of the wobble-plate.

In Fig. 1 there is shown in full lines III, IV and V the principal shape of the lemniscate shaped paths in three dimensions. The curve IV is viewed in radial direction towards the wobble-plate and the curves III and V in tangential direction thereto. The angle $a$ is purposely made larger than that preferred in a practical embodiment in order to exaggerate the looped paths for the sake of clarity. In a projection viewed parallel to the system axis as shown in Fig. 2 the loop lines III, IV and V appear as circles III, IV and V having a diameter equal to $R(1-\cos.\ a)$ and these circles are traced twice for each revolution of the engine shaft 1, the trace occurring in the same direction as the direction of rotation of the shaft 1. The great circle having the radius R circumscribes the circular projections of the paths.

Several solutions have been proposed in which the kinematic requirements for enforcing the tracing of lemniscate shaped paths on a spherical surface are theoretically complied with. None of the hitherto proposed structural solutions have, however, been a success in practice as they are either too complicated and thus too expensive to manufacture and too sensitive in operation, or because they could not be so constructed that they were able to withstand the stresses encountered in operation.

The present invention provides in contradistinction thereto a simple and solid structure involving low manufacturing costs. The inventive solution of the structural problem permits liberal dimensioning of all parts in relation to the stresses occurring and has the advantage that the space requirements and the weight of the structure are small. The invention meets all the practical requirements and particularly affords reliability of operation and durability.

The invention consists essentially in coupling a wobble-plate gear to a guide system known as a "lemniscate link guide" in such a way that both mechanisms pass through their dead points simultaneously and in selecting the elements of the lemniscate link guide of the proper dimensions and proportions whereby the necessary looped paths of the wobble-plate gear are automatically enforced.

In the accompanying drawings only that principal embodiment of the lemniscate link guide is shown which appears to be the most suitable one for the desired purpose. This link guide consists, as shown in the diagrammatic Figs. 3, 4 and 5, of two links 8 and 9 swingably secured at the points 10 and 11 to the engine frame. These links are pivotally secured to a connecting member 12 of considerably shorter length by means of pivot pins at the points 13 and 14. At the mid point 15 of the connecting member 12 there is provided a universal joint, by means of which the lemniscate link guide is connected with the wobble-plate at a point in the plane thereof. Of course, the links 8 and 9 must be supported on the engine frame at the points 10 and 11 in a manner permitting at least two degrees of freedom so that the point 15 may move along a spherical path. The lemniscate link guide at the same time forces the point 15 to move only in the looped path of lemniscate shape determined by the proportions of the lemniscate guide whereby wobble-plate is caused to perform the characteristic wobbling movement.

In order to more clearly show the operation of the device an angle $a$ greater than is normally practical has been selected and this angle results in an exaggerated showing of the path in Figs. 3 to 5. For the same reason the wobble-plate itself has been omitted and in Figs. 4 and 5, only the wobble-plate center O is shown. In addition, a radius R of the wobble-plate plane is coupled with point 15 of the connecting member 12 and finally, the amplitude $\pm a$ of this radius in a plane including the system axis is shown in Fig. 5 and the apparent tangential amplitude $\pm \beta$ in a plane perpendicular to the system axis is shown in Fig. 4.

If the engine shaft 1 is rotated the radius R of the wobble-plate plane describes its oscillating movement with the angle $a$ in a plane including the system axis whereby, due to the connection at the point 15 the connecting member 12 and the lemniscate link guide secured thereto are forced to move between their dead center points, i. e. to participate in the oscillation over the angle $\pm a$. The lemniscate link guide passes through the intermediate positions 8', 9' and 8'', 9'' et cetera as shown in dash and dotted lines respectively until upon a complete revolution of the shaft 1 the entire loop line IV of Fig. 3 has been traced. The width $d$ of the looped curve depends on the lengths of the links 8 and 9 with relation to the distance between the attachment points to the engine frame 10 and 11.

Fig. 4 shows an axial projection of the device in which the loop line, as already mentioned, appears as a circular line IV traced twice for each cycle. The lemniscate link guide is shown in both dead center points and in the middle position corresponding to the point of intersection of the looped curves as the line 10, 11. As it always must follow the loop line the radius R performs an apparent harmonic oscillation as viewed in axial direction with a double frequency through the angle $\pm \beta$.

In Fig. 5 the looped curve appears as a wavy line. The radius R performs a harmonic oscillation having an amplitude of $\pm a$ in a plane including the system axis and in accordance with the fundamental frequency. The link guide appears in this projection always as a straight line and more particularly in the dead center points as a chord to the arc having the angle $a$ and the radius R whereas in the middle positions 13°, 14°, 15° the link guide coupled to the wobble-plate appears as a tangent.

In addition to the form of the lemniscate link guide illustrated in the drawing other forms may also be used. In many cases it might also be found preferable not to couple a point in the wobble-plate plane or the corresponding radius directly to the link guide but to couple the lemniscate link guide to the piston connecting rod or the like. In such cases it may also be necessary to guide this connecting point along a loop line traced on a cylindrical surface which is coaxial to the system axis rather than on a spherical surface. To illustrate and describe all conceivable modifications and combinations is, of course, not practical and therefore the drawing and the specification are limited to the principle and the corresponding forms which present the inventive idea in the clearest manner and which probably set forth the most useful embodiment.

As above stated the figures are intentionally shown with an exaggerated angle $a$. In reality, i. e. at normal values of the angle $a$, the looped curves will be considerably narrower. If a lemniscate link guide is to govern such narrow looped curves as will occur in the practical application of wobble-plate driving gears then the connecting member 12 will have to be reduced to such a comparatively small length that it would be difficult to make the pivotal connections 13 and 14 sufficiently large to carry the resulting loads not to speak of the necessity for finding space between these pin joints for the necessary universal joint connection with the wobble-plate.

The lemniscate link guide which, according to the invention, is intended to guide automatically and positively the looped paths in three dimensions must simultaneously absorb the reaction moment of the engine. As the wobble-gear is used to accommodate a relatively large number of engine cylinders arranged concentrically around a driving gear the reaction moment to be aborbed is comparatively large. This requires substantially large bearing areas in the guiding mechanism to ensure reliability of operation and durability thereof.

The present invention also presents a practical solution to this problem which is illustrated in Figs. 6 to 10.

In Fig. 6 there is shown a looped curve IV in accordance with a practical embodiment of the invention. From this figure it is apparent how short the connecting member 12 must be in an actual embodiment, the size of this member corresponding to the distance between the connection points 13 and 14. Figs. 6 and 7 illustrate a design of a lemniscate link guide which makes possible the practical application of the invention.

In Figs. 6 and 7, the numerals 8 and 9 indicate the links of the lemniscate link guide, which may swing about the corresponding connecting points or bearing pins 10 and 11. In view of the fact that the links 8 and 9 are directly connected through connecting member 12 with connecting stud 4 on the wobble-plate, the guide links 8 and 9 must be secured to the suspension points 10 and 11 on the engine frame by a ball joint, so that the point 15 of the connecting member 12 of the lemniscate link guide describes a looped path, always on a spherical surface of the wobble gear. In the form shown the same simple form of a ball joint is used as for the universal joint connection between the lemniscate link guide and the wobble-gear at point 15 of the connection member.

In Fig. 7 which shows a projection of Fig. 6 in a direction parallel to the system axis the connection of the link 8 to the engine frame is shown in section taken on line X—X of Fig. 6, whereas the universal joint at the connection point 15 common to both mechanisms as well as the connecting member 12 is shown as taken on the line Z—Z in Fig. 6.

From Figs. 6 to 10 it appears that the connecting member 12 of the lemniscate link guide has a special design which appears most clear from Figs. 8 to 10. Fig. 8 is a view of the connecting member 12 axially of the pivot pins 13 and 14 connecting the member 12 to the links 8 and 9 of the lemniscate link guide. The link pins 13 and 14 are in Figs. 8 to 10 enlarged so as to form eccentric discs 130, 140 and 141 overlapping one another. These discs are of such a size that the overlapping thereof will accommodate the universal or ball joint at point 15. The entire connecting member 12 of the lemniscate link guide comprises only the eccentric discs 130, 140 and 141 positioned side by side and overlapping one another. These discs at the same time replace the pivot pins 13 and 14 of an ordinary lemniscate link guide. Spherical recesses are provided in the connecting member 12 for receiving the ball joint at point 15 and in order to permit assembly of the parts opposed slots 20 are provided in the eccentric 140 communicating with the spherical recess therein while grooves having the same dimensions as slots 20 are provided in the eccentric 130. These grooves have a depth substantially one-half the thickness of the eccentric.

A coupling link 21 having a spherical circumferential surface and flat parallel ends may be assembled with the eccentrics by passing the link sidewise through the slots after which the link may be rotated 90 degrees to properly dispose the same within the spherical recess. The link 21 may then be secured to a connecting pin 4 on the wobble-plate by means of spacing springs 22 and a nut or the like 23. This provides an articulated connection between the wobble-plate and the lemniscate link guide.

A similar structure may be utilized to secure links 8 and 9 to the bearing mounts 100 and 110 on the engine frame.

Fig. 9 shows a section through the connecting member 12 on a line Y—Y in Fig. 7. In order to prevent any lateral tilting due to unsymmetrical application of forces on the connecting member 12 one eccentric is preferably formed with two symmetrical portions 140 and 141.

Fig. 10 illustrates the connecting member 12 as viewed in the direction of the arrow A in Fig. 8.

While the above described mechanism is theoretically correct and operative in actual practice it would be difficult to maintain manufacturing tolerances sufficiently close to preclude the danger of undue shock and strain when passing through the dead center points.

In order to avoid such risk as well as to reduce the manufacturing costs substantially it is sufficient to provide a yielding or elastic mount for the bearings or to provide yieldable connections in the mechanisms. The most preferable arrangement appears to be a yieldable mount for one of the points 10 or 11 on the engine frame.

In Figs. 3 and 4 a yieldable mount is shown by way of example and comprises a link 102 pivotally mounted on a pin 103 the opposite end of the link 102 being pivotally secured to link 8. Oscillation of the link 102 is restricted in both directions by rubber cushions or the like 104 and 105, which are secured to the engine frame. A relatively small movement of link 102 is sufficient to prevent undesirable shocks in the mechanism, and this structure does not interfere with the proper guidance of the wobble-plate. Of course, both attachment points 10 and 11 may be provided with yieldable securing means, or yieldable means may be provided in other parts of the mechanism. The above described form however appears preferable.

It has been found that proper movement of the wobble-plate may be obtained by attaching the guiding mechanism to only one point in the wobble-plate plane. Of course a plurality of guiding mechanisms may be employed but this unnecessarily increases the cost and results in additional mechanical difficulties.

It is further not necessary to take special measures to ensure that the different movements in different paths of the lemniscate link guide take place in the correct order of sequence or that the path after reaching a dead center point is not retraced along the same branch of the path already traced. Such an operation is prevented by the continuous load on the link guide which effectively prevents a reverse movement thereof. This undesirable operation is further prevented by locating the center of gravity of the link guide as referred to its midpoint 15 in a direction opposite to the direction of rotation of the engine shaft 1. This results in an inertia loading of the guide in a direction resisting backward movement thereof.

Obviously this invention may be applied to wobble-plates of many different shapes and variations of the link guide are also possible. For example, the points 10 and 11 may be secured to the wobble-plate and the connecting member 12 may be secured to the engine.

The examples shown and described are to be considered as merely illustrative of the principles of the invention and in no way a limitation thereof.

It will be obvious to those skilled in the art that various changes may be made in the inven-

I claim:

1. In an apparatus for guiding the movement of a wobble-plate, a support, a rotatable shaft mounted on said support, means securing the wobble-plate to said shaft at an angle to the axis thereof, a pair of links, a common connecting member for said pair of links pivotally secured to one end of each link of the pair, means comprising a universal joint pivotally securing said connecting member to said wobble-plate at a point in the wobble plane thereof, universal joints pivotally securing the opposite ends of said links to said support, said links and said connecting member constituting a lemniscate link guide whereby the point of attachment of said connecting member to said wobble-plate is guided in a lemniscate path.

2. In an apparatus for guiding the movement of a wobble-plate, a support, a rotatable shaft mounted on said support, means securing the wobble-plate to said shaft at an angle to the axis thereof, a pair of links, a common connecting member for said pair of links pivotally secured to one end of each link of the pair, means pivotally securing the midpoint of said connecting member to said wobble-plate at a point in the wobble plane thereof, the opposite ends of said links being pivotally mounted on said support, said links and said connecting member constituting a lemniscate link guide whereby the point of attachment of said connecting member to said wobble-plate is guided in a lemniscate path.

3. An apparatus a defined in claim 1 in which said common connecting member comprises offset eccentric discs, a spherical recess in said discs and a spherical member carried by said wobble-plate and disposed in said recess, said eccentric discs constituting the pivot connections between said links and said common connecting member, and said spherical recess and spherical member providing a universal joint.

4. In an apparatus for guiding the movement of a wobble-plate, a support, a rotatable shaft mounted on said support, means of securing the wobble-plate to said shaft, and a lemniscate link guide for guiding a point on said wobble-plate in a lemniscate path comprising three link members serially connected by articulate joints, means providing a pivotal connection between said wobble-plate and the intermediate one of said link members and means providing pivotal connections between said support and the remaining ones of said link members.

5. Apparatus as defined in claim 4, in which said link members are rigid, said articulate joints provide for pivotal movement between said intermediate member and the remaining link members only in a common plane and the means providing said pivotal connections provide for universal movement between said intermediate link member and the wobble-plate on the one hand and universal movement between the remaining links and said support on the other hand.

6. Apparatus as defined in claim 4, in which the means providing at least one of said pivotal connections includes a yieldable element.

7. Apparatus as defined in claim 4, in which the means providing at least one of said pivotal connections includes a yieldable element yieldable only in a direction substantially parallel with the axis of rotation of said shaft.

8. Apparatus as defined in claim 4, in which the means providing at least one of said pivotal connections includes a yieldable element and resilient material for resisting movement of said yieldable element.

9. Apparatus as defined in claim 4, in which the means providing a pivotal connection between said support and at least one of said remaining link members includes a yieldable element.

10. In apparatus of the character described, the combination with a shaft carrying a wobble-plate member inclined at an angle to the axis of rotation of the shaft and a support member with respect to which said shaft is rotatably mounted, of guide means for causing a given point on said wobble-plate member in the wobble plane thereof to follow a lemniscate path of motion upon relative rotation between said shaft and said support member, said guide means comprising an articulated linkage connecting said point and said support member, said linkage comprising a pair of relatively long link members each connected at one of its ends to a different place on a relatively short connecting link, said short link being pivotally connected to one of said members at a place on the short link other than the place of attachment thereto of either of said relatively long links and the other ends of said relatively long links being pivotally connected to the other one of said members.

11. An apparatus as defined in claim 1 in which the portion of the total mass of the link guide, considered in the direction of normal rotation of said shaft, on the side in advance of said point of attachment is less than the mass of the remaining portion of the link guide, whereby an inertia loading is applied to the link guide at the dead center positions thereof resisting backward movement of said guide to thereby cause said guide to follow the desired sequence of movements.

EDMUND ERNST KARL SPARMANN.

REFERENCES CITED

The following references are of record in the file of this patent:

UNITED STATES PATENTS

| Number | Name | Date |
|---|---|---|
| 142,611 | Carothers | Sept. 9, 1873 |
| 1,814,946 | McGeorge | July 14, 1931 |
| 1,858,182 | Bramson | May 10, 1932 |
| 2,105,019 | Turner | Jan. 11, 1938 |
| 2,368,933 | Lindeman | Feb. 6, 1945 |
| 2,398,486 | Woods | Apr. 16, 1946 |
| 2,436,908 | Van Weenan et al. | Mar. 2, 1948 |

FOREIGN PATENTS

| Number | Country | Date |
|---|---|---|
| 657,724 | France | May 27, 1929 |